(12) United States Patent
Sprague et al.

(10) Patent No.: US 8,891,125 B2
(45) Date of Patent: Nov. 18, 2014

(54) METHOD AND SYSTEM FOR AUTOMATICALLY REDUCING PAGE COUNT IN A DOCUMENT PRINTING PROCESS

(75) Inventors: Mary Ann Sprague, Macedon, NY (US); Mary Catherine McCorkindale, Fairport, NY (US); Patricia L. Swenton-Wall, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 806 days.

(21) Appl. No.: 12/543,182

(22) Filed: Aug. 18, 2009

(65) Prior Publication Data

US 2011/0043831 A1    Feb. 24, 2011

(51) Int. Cl.
G06K 15/02    (2006.01)
G06F 3/12    (2006.01)

(52) U.S. Cl.
CPC ............ G06F 3/1254 (2013.01); G06F 3/1219 (2013.01)
USPC ........................... 358/1.2; 358/1.11; 358/1.18

(58) Field of Classification Search
USPC ............... 399/364; 715/249; 705/8; 400/304
See application file for complete search history.

(56) References Cited

U.S. PATENT DOCUMENTS

| | | | | |
|---|---|---|---|---|
| 5,803,629 | A * | 9/1998 | Neville et al. .................. 400/304 |
| 7,259,874 | B2 | 8/2007 | Nishikawa et al. |
| 7,359,083 | B2 * | 4/2008 | Salgado ........................ 358/1.18 |
| 2004/0017577 | A1 * | 1/2004 | Ostrover et al. ............. 358/1.15 |
| 2005/0160194 | A1 * | 7/2005 | Bango et al. ...................... 710/8 |
| 2005/0262441 | A1 * | 11/2005 | Yoon .............................. 715/526 |
| 2006/0082803 | A1 * | 4/2006 | Nishikawa et al. .......... 358/1.13 |
| 2006/0173722 | A1 * | 8/2006 | Mizutani ........................... 705/8 |
| 2007/0127961 | A1 * | 6/2007 | Han et al. ....................... 399/364 |
| 2007/0128899 | A1 * | 6/2007 | Mayer .......................... 439/152 |
| 2007/0146743 | A1 * | 6/2007 | Karn et al. ...................... 358/1.9 |
| 2007/0171459 | A1 * | 7/2007 | Dawson et al. ............... 358/1.15 |
| 2007/0258097 | A1 * | 11/2007 | Nishikawa et al. ............ 358/1.1 |
| 2007/0273895 | A1 | 11/2007 | Cudd et al. |
| 2008/0021880 | A1 * | 1/2008 | Ren et al. .......................... 707/3 |
| 2008/0037062 | A1 * | 2/2008 | Omino et al. ................ 358/1.15 |
| 2008/0225336 | A1 * | 9/2008 | Dawson et al. .............. 358/1.15 |
| 2009/0273806 | A1 * | 11/2009 | Nishikawa et al. .......... 358/1.15 |
| 2010/0251104 | A1 * | 9/2010 | Massand ........................ 715/249 |
| 2011/0043846 | A1 * | 2/2011 | Sprague et al. .............. 358/1.15 |
| 2011/0109929 | A1 * | 5/2011 | Korndoerfer ................ 358/1.11 |
| 2011/0194135 | A1 * | 8/2011 | Hamilton et al. ............ 358/1.15 |

OTHER PUBLICATIONS http://www.printgreener.com/, Accessed Apr. 29, 2009.

* cited by examiner

*Primary Examiner* — Firmin Backer
*Assistant Examiner* — Nicholas Pachol
(74) *Attorney, Agent, or Firm* — Fox Rothschild LLP

(57) ABSTRACT

A system automatically determines whether to shrink a document to be printed by determining whether various parameters of the final page of the document satisfy certain criteria. If so, the system may automatically shrink the document by using a shrink-to-fit process and/or by automatically reducing the font size of some or all content in the document.

15 Claims, 3 Drawing Sheets

METHOD AND SYSTEM FOR AUTOMATICALLY REDUCING PAGE COUNT IN A DOCUMENT PRINTING PROCESS

CROSS REFERENCE TO RELATED APPLICATIONS

This application is related to U.S. patent application Ser. No. 12/543,096 filed Aug. 18, 2009.

BACKGROUND

This document describes methods and systems for reducing the printing of unnecessary pages from web sites and similar sources.

Print job requests are often associated with printing parameters that affect the size of the output of the request, particularly in terms of paper usage. Commonly used printing parameters include font selection, font size, font style and spacing options. While a print job request with a large font size and style and increased spacing options may be aesthetically pleasing, such a request often results in an increased amount of paper usage.

Global awareness of environmental issues has led to increased concern regarding the amount of carbon or equivalent emissions being released into the atmosphere. A measurement of these emissions is generally referred to as a carbon footprint. The amount of paper that a company uses directly relates to its carbon footprint. As such, companies and users are looking for an environmentally friendly option that reduces paper usage and the resulting carbon footprint.

Files describing web pages often include embedded copyrighted information and/or carriage returns at the end of the file. In some cases, the user does not require such information to be included. In fact, many users end up throwing away the last page or last few pages when printing out information from a web page.

Current applications have user selectable print options, such as an option to "fit on one page" that scales the output to fit a specified page size. Such a print option can greatly reduce the text size and result in a document that is more difficult to read. Alternatively, manual editing can allow a user to select different font sizes and other print options in order to reduce paper usage. These options are commonly available in word processing, spreadsheet and other software applications. However, these options do not solve the problem associated with printing unnecessary pages from web sites or other documents.

SUMMARY

This disclosure is not limited to the particular systems, devices and methods described, as these may vary. The terminology used in the description is for the purpose of describing the particular versions or embodiments only, and is not intended to limit the scope. For example, the singular forms "a," "an," and "the" include plural references unless the context clearly dictates otherwise. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. As used herein, the term "comprising" means "including, but not limited to."

In an embodiment, a system for performing a print job request includes a processor, a printing device, and a computer-readable storage medium in communication with the processor. The computer-readable storage medium includes one or more programming instructions for receiving a print job request having a first set of one or more printing parameters. The print job request may, for example, pertain to information displayed on a web site. The instructions also cause the processor to identify a final page of the print job request, determine a measurement for the final page, determine a threshold value based on a second set of one or more printing parameters, and determine whether to shrink the print job request based on the measurement and the threshold value. Responsive to the measurement and the threshold value, the instructions may cause the processor to apply a shrink-to-fit process to the print job request to yield a modified print job request. The modified print job request may then be stored and/or performed via the printing device to yield a printed document.

Relevant measurements on the final page may include parameters such as a number of lines to be printed on the final page, or a percentage of space that will be used on the final page bearing printed material.

The shrinking may be done by a shrink-to-fit process, and/or by reducing font size. This may occur automatically, or a user may be given the opportunity to opt out. Optionally, the reduction may be done only if the original document would have yielded an odd number of printed document sides.

BRIEF DESCRIPTION OF THE DRAWINGS

Aspects, features, benefits and advantages of the present application will be apparent with regard to the following description and accompanying drawings, of which.

DETAILED DESCRIPTION

The following terms shall have, for the purposes of this application, the meanings set forth below.

For the purposes of the discussion below, a "printing device" is an electronic device that is capable of receiving commands and printing text and/or images on a substrate. Printing devices may include, but are not limited to, network printers, production printers, copiers, facsimile devices, other devices using ink or toner, and scanners. A printing device may also perform a combination of functions such as printing/scanning/copying/faxing, in which case such a device may be considered to be a multifunctional device.

A "page" or "side" of a document refers to a discrete portion of a document that can be embodied on a single side of a substrate used by a printing device. The substrate may be a sheet of paper and/or the like.

A "line" refers to a discrete unit of measured distance in a vertical orientation of a web page. A line may include a group of text that has the same vertical placement on a web page.

Figure 1:
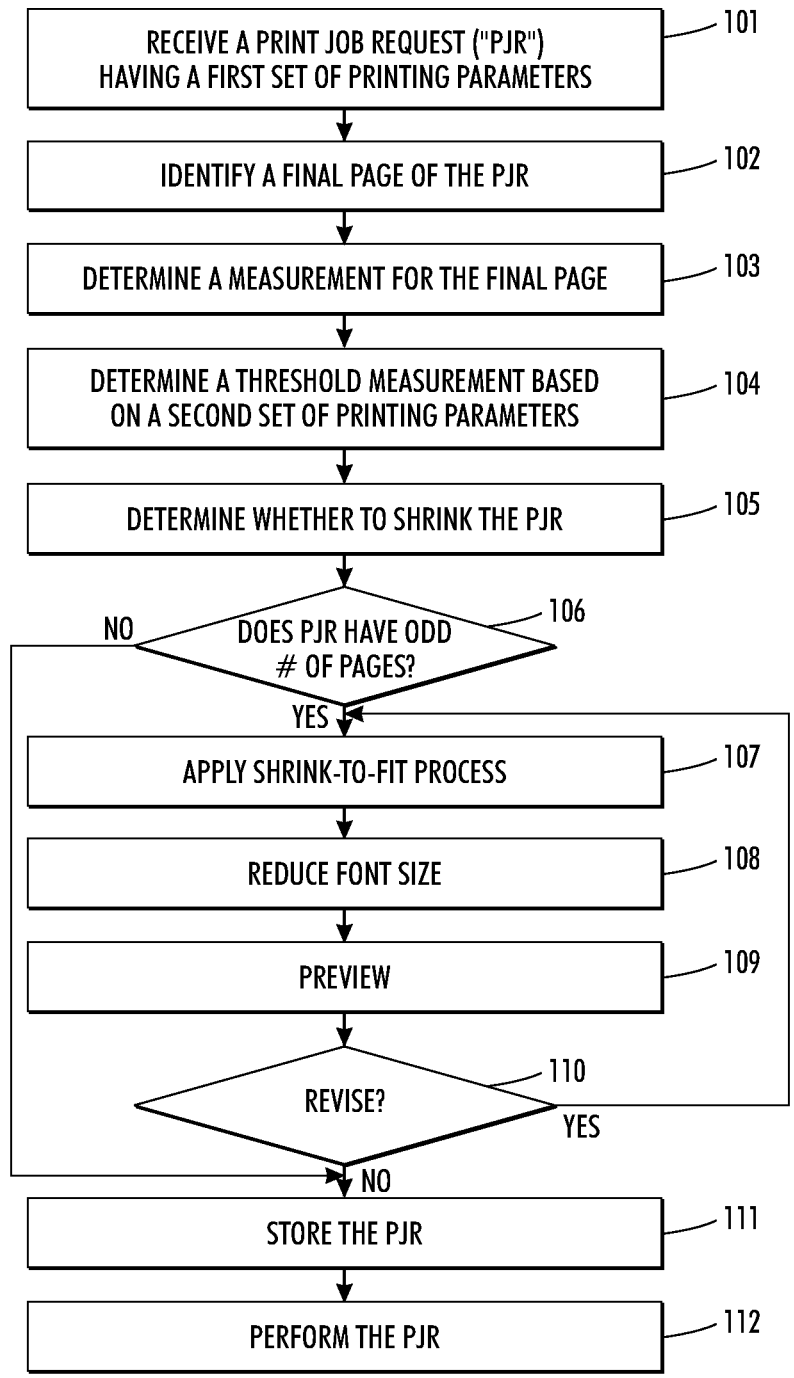
FIG. 1 depicts a flow diagram of an exemplary method of performing a print job request according to an embodiment.

FIG. 1 depicts a flow diagram of an exemplary method of performing a print job request according to an embodiment. As shown in FIG. 1, a print job request having a first set of printing parameters may be received 101 from a server. Printing parameters may include font, format, text size and/or the like. Additional and/or alternate types of printing parameters may also be used within the scope of this disclosure. The print job request may pertain to information displayed on a web site and/or the like. A user may be presented with a selection of printing parameters, wherein the user selected set of printing parameters may be sent to a server.

A final page of the print job request may be identified 102. In an embodiment, a count of a total number of pages associated with an expected print job output based on a first set of printing parameters may include a last page. The last page of the total number of pages associated with the expected print job output of the print job request may be the final page of the print job request. Additional and/or alternate types of identification techniques may also be used within the scope of this disclosure.

A measurement for the final page may be determined 103. In an embodiment, the measurement may include a number of lines, or distance from the top or top margin, printed on the final page. In another embodiment, the measurement may include a percentage of space used on the final page for printing purposes. Printing purposes may include a page bearing printed materials. For example, the measurement may be 25% utilization of a set printable area of the final page. Additional and/or alternate types of measurements may also be used within the scope of this disclosure.

A threshold value based on a second set of one or more printing parameters may be determined 104. In an embodiment, the threshold value may include a number of lines, or distance from the top or top margin, printed for a page. In another embodiment, the threshold value may include a percentage of space used on a page for bearing printed materials. For example, the threshold value may be 25% utilization of a set printable area of a page. Additional and/or alternate types of thresholds may also be used within the scope of this disclosure.

A determination of whether to shrink the print job request may be performed 105 based on the line or distance of printed area/space measurement and the threshold value. In an embodiment, determining 105 whether to shrink the print job request may include determining the measurement on the final page is greater than or equal to the threshold value. For example, the threshold value may be set to 10 lines, meaning that it is not desired to print a final page containing less than 10 printed lines. In such a case, if the measurement on the final page is, for example, 15 lines, then a determination may be made that shrinking is not desirable. Additional and/or alternate types of measurements and threshold measurements may also be used within the scope of this disclosure.

Alternately, determining 105 whether to shrink the print job request may include determining whether the measurement on the final page is less than the threshold value. For the example listed, if it is determined that the printed portion of a final page would be 8 lines (i.e., less than the threshold of 10), it may be desirable to shrink the print job request.

If it is determined that shrinking the print job is desirable 105, the system may automatically use a shrink-to-fit algorithm to modify 107 the print job request so that it will print on one less page than the original print job request would have used. The shrink-to-fit algorithm may be applied to the entire print job, or the shrink-to-fit algorithm may be applied to only a specified number of final pages of the print job, such as the final two pages. Optionally, the modification may only be done if the original print job request would have resulted in printing on an odd number of document sides 106. This option 106 may be considered when duplex (two-sided) printing is planned, because reducing one printed side from a duplex-printed job having an even number of printed document sides would not have yielded any reduction in paper usage.

Alternatively, instead of or in addition to applying a shrink-to-fit algorithm, the method may include analyzing the font size of the print to be used in narrative content in the print job request to determine whether a font size reduction would reduce page count. If the system determines that the font size exceeds a predetermined threshold of minimum desired font size (e.g., 11-point font), the system may reduce 108 the font size of some or all of the narrative content to reduce the number of printed document sides that will result. This may be done automatically, or the user may be given the opportunity to accept or reject a reduced font size. Optionally, the font size reduction 108 will only occur if the page count of the original document exceeds a predetermined number of pages, as only larger documents may actually yield a reduced page count when font size is reduced. The font size analysis and reduction may be applied to the entire document, or it may be applied to only a specified number of final pages of the document, such as the final two pages. In some embodiments, the minimally acceptable font size may be a font size that is readable at a comfortable level for a user. Strain on a user's eyes may be a factor as to what may be a comfortable reading level for a user. Additional and/or alternate types of threshold measurements may also be used within the scope of this disclosure.

In an embodiment, a preview of the shrunken print job request may be presented to the user on a display device 109. The user may then have the opportunity to revise 110 the print job request. Available revisions may include a rejection of some or all changes; acceptance of the changes; or reprocessing the document with an additional shrink-to-fit algorithm 107 or an additional reduction in font size. After acceptable revisions are complete, the shrunken print job request may be stored 111 in a memory, buffer or cache. The request may then be performed 112 to yield a printed document. In an embodiment, the print job request may be performed 112 on a printing device. Additional and/or alternate types of performance of the second print job request may also be used within the scope of this disclosure.

Figure 2:
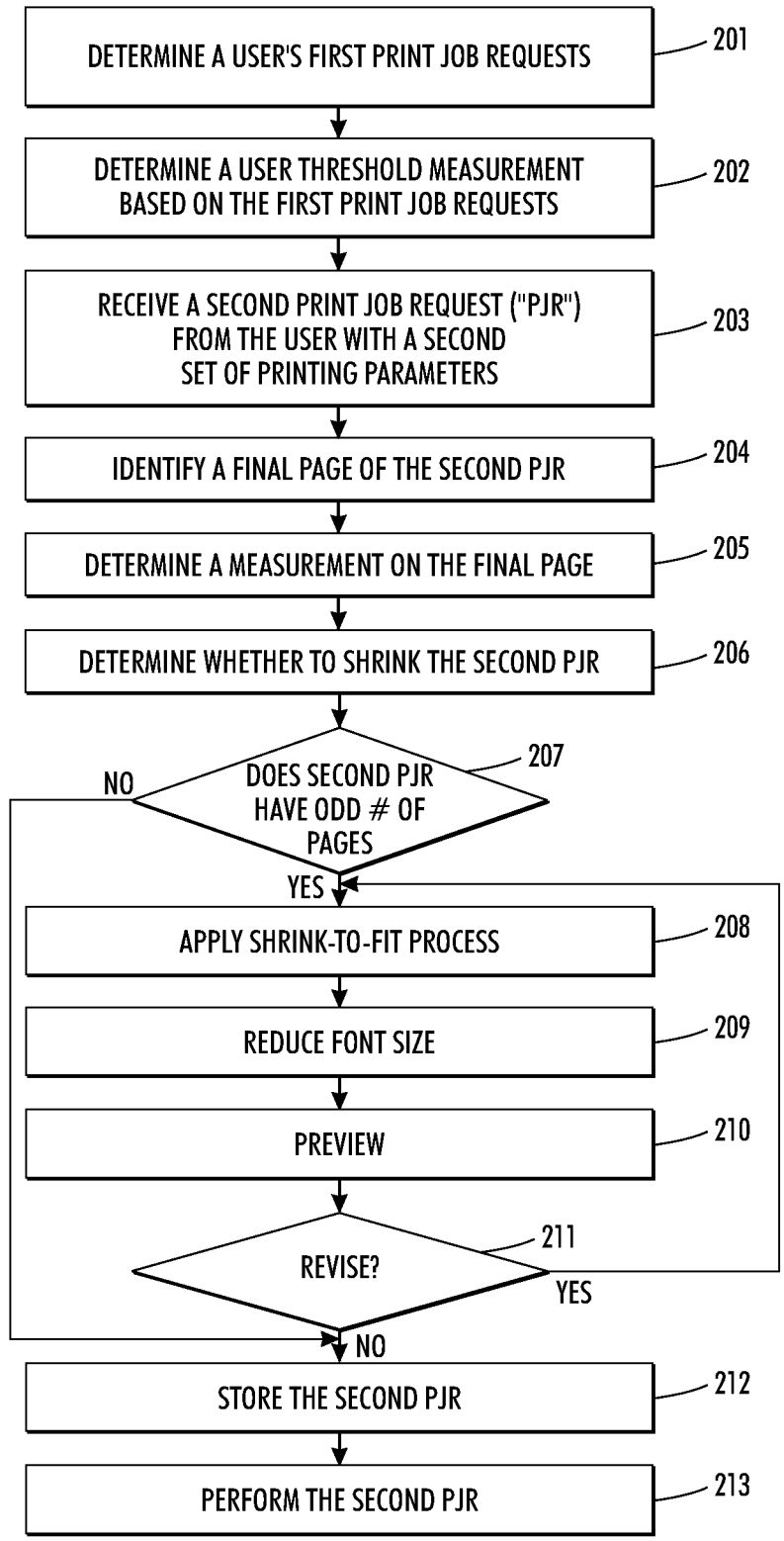
FIG. 2 depicts a flow diagram of an exemplary method of printing a print job request received from a user having a history of first print job requests according to an embodiment.

FIG. 2 depicts a flow diagram of an exemplary method of printing a print job request received from a user having a history of previous print job requests according to an embodiment. As shown in FIG. 2, one or more first print job requests associated with a user may be determined 201. Each of the first print job requests may include an associated set of one or more printing parameters. Printing parameters may include font, format, text size and/or the like. Additional and/or alternate types of printing parameters may also be used within the scope of this disclosure.

A user threshold measurement based on the first print job requests may be determined 202. In an embodiment, the user threshold measurement may include a number of lines printed for a page. In another embodiment, the user threshold measurement may include a percentage of space used on a page for printing purposes. Printing purposes may include a page bearing printed materials. For example, the user threshold measurement may be 25% utilization of a set printable area of a page. Additional and/or alternate types of user threshold measurements may also be used within the scope of this disclosure.

A second print job request with a second set of printing parameters may be received 203 from the user. A user may be presented with a selection of printing parameters, from which the user selects the second set of printing parameters. Additional and/or alternate types of user selection of printing parameters may also be used within the scope of this disclosure.

A final page of the second print job request may be identified 204, and a measurement on the final page may be determined 205. In an embodiment, the measurement may include a number of lines printed on the final page. In another embodiment, the measurement may include a percentage of space used on the final page for printing purposes. Printing purposes may include a page bearing printed materials. For example, the measurement may be 25% utilization of a set printable area of the final page. Additional and/or alternate types of measurements may also be used within the scope of this disclosure.

A determination as to whether to shrink the second print job request may be made 206 based on the measurement of the final page and the user threshold measurement. Determining 206 whether to shrink the second print job request may include determining whether the measurement on the final page is less than the user threshold measurement.

If it is determined that shrinking the second print job is desirable 205, the system may automatically apply a shrink-to-fit algorithm 208 to modify the second print job request to print on one less page than the original print job request would have used. The shrink-to-fit algorithm may be applied automatically, or the user may be given the opportunity to accept or reject a reduced page count. The shrink-to-fit algorithm may be applied to the entire print job, or the shrink-to-fit algorithm may be applied to only a specified number of final pages of the print job, such as the final two pages.

Optionally, the modification may only be done if the original second print job request would have resulted in printing on an odd number of document sides 207. This option 207 may be considered when duplex printing is planned, because reducing one printed side from a duplex-printed job having an even number of printed document sides would not have yielded any reduction in paper usage.

Alternatively, instead of or in addition to applying a shrink-to-fit algorithm, the method may include analyzing the font size of the print to be used in narrative content in the second print job request. If the system determines that the font size exceeds a predetermined threshold of minimum desired font size (e.g., 11-point font), the system may reduce 209 the font size of some or all of the narrative content to reduce the number of printed document sides that will result. This may be done automatically, or the user may be given the opportunity to accept or reject a reduced font size.

In an embodiment, a preview of the shrunken second print job request may be presented to the user on a display device 210. The user may then have the opportunity to revise 211 the second print job request. Available revisions may include a rejection of some or all changes; acceptance of the changes; or reprocessing the document with an additional shrink-to-fit algorithm 208 or an additional reduction in font size. After acceptable revisions are complete, the shrunken print job request may be stored 212 in a memory, buffer or cache. The request may then be performed 213 to yield a printed document. In an embodiment, the print job request may be performed 213 on a printing device. Additional and/or alternate types of performance of the second print job request may also be used within the scope of this disclosure.

Figure 3:
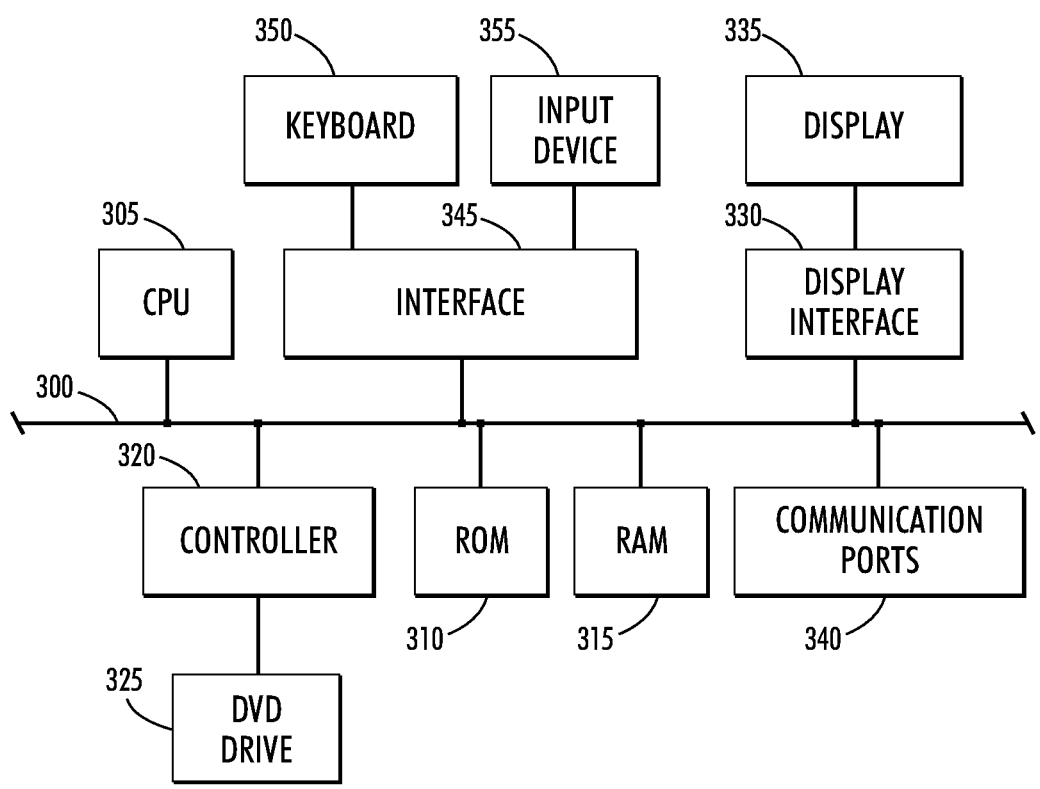
FIG. 3 illustrates a system that may be used in accordance with various embodiments.

FIG. 3 depicts a block diagram of an exemplary system that may be used to contain or implement program instructions for incentivizing remote servicing. Referring to FIG. 3, the exemplary system may include internal hardware which may be used to contain or implement program instructions according to an embodiment. A bus 300 serves as the main inform highway interconnecting the other illustrated components of the hardware. CPU 305 is the central processing unit of the system, performing calculations and logic operations required to execute a program. Read only memory (ROM) 310 and random access memory (RAM) 315 constitute exemplary memory devices.

An output device may communicate with the processor. Further, a computer-readable storage medium including one or more programming instructions may communicate with the processor. A controller 320, which may include a conventional processor, may be operatively associated with interfaces with one or more optional memory devices 325 to the system bus 300. These memory devices 325 may include, for example, an external or internal DVD drive, a CD ROM drive, a hard drive, flash memory, a USB drive or the like. As indicated previously, these various drives and controllers are optional devices.

Programming instructions may be stored in the ROM 310 and/or the RAM 315. Optionally, program instructions may be stored on a tangible computer-readable storage medium such as a compact disk, a digital disk, flash memory, a memory card, a USB drive, an optical disc storage medium, such as Blu-ray™ disc, and/or other recording medium.

An optional display interface 330 may permit information from the bus 300 to be displayed on a display 335 in audio, visual, graphic or alphanumeric format. Communication with external devices may occur using various communication ports 340. An exemplary communication port 340 may be attached to a communications network, such as the Internet or an intranet. Information detailing the one or more updates to printing parameters may, for example, be displayed on an output device. In an embodiment, displaying such information may include causing the information to be displayed on printing devices, display devices and/or the like. Additional and/or alternate output devices may be utilized within the scope of this disclosure.

The hardware may also include an interface 345 which allows for receipt of data from input devices such as a keyboard 350 or other input device 355 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A system for performing a print job request, comprising:
 a processor; and
 a computer-readable storage medium in communication with the processor, wherein the computer-readable storage medium comprises one or more programming instructions for:
  identifying one or more first print job requests associated with a user, wherein the one or more first print job requests have been previously processed,
  identifying one or more first printing parameters associated with the one or more first print job requests,
  receiving a second print job request having one or more second printing parameters,
  identifying a final page of the second print job request, determining, via the processor, a measurement associated with an amount of space on the final page that is used for printing purposes, selecting, via the processor, a threshold value based on the one or more first printing parameters, determining whether to shrink at least a portion of the second print job request based on at least the measurement and the threshold value, in response to determining to shrink at least a portion of the second print job request:

using a shrink-to-fit process to yield a modified print job request, determining whether a page count associated with the second print job request exceeds a number of pages, and in response to the page count exceeding the number of pages, automatically reducing a font size of at least a portion of narrative content in the second print job request; and storing the modified print job request wherein the one or more programming instructions for determining whether to shrink at least a portion of the second print job request comprise one or more programming instructions for:

determining that the second print job request would yield an odd number of printed pages; and in response to determining that the second print job request would yield an odd number of printed pages, determining to shrink the second print job request.

2. The system of claim 1, wherein the storage medium also includes at least one programming instruction for performing, via a printing device, the modified print job request to yield a printed document.

3. The system of claim 1, wherein the one or more programming instructions for determining a measurement for the final page comprise one or more programming instructions for determining a number of lines printed on the final page.

4. The system of claim 1, wherein the one or more programming instructions for determining a measurement for the final page comprise one or more programming instructions for determining a percentage of space to be used on the final page for bearing printed material.

5. The system of claim 1, wherein the one or more programming instructions for selecting a threshold value based on the one or more first printing parameters comprise one or more programming instructions for determining a number of lines to be printed on the final page.

6. The system of claim 1, wherein the one or more programming instructions for selecting a threshold value based on the one or more first printing parameters comprise one or more programming instructions for determining a percentage of space to be used on the final page for bearing printed material.

7. The system of claim 1, wherein the one or more programming instructions for determining whether to shrink at least a portion of the second print job request comprise one or more programming instructions for:

determining whether the measurement on the final page is less than the threshold value; and in response to determining that the measurement is less than the threshold value, determining to shrink the second print job request.

8. The system of claim 1, wherein the programming instructions further comprise one or more instructions for:

presenting, via a display device, a preview of the modified print job request; and receiving, via an input device, a user request to revise the modified print job request.

9. A method of performing a print job request, the method comprising:

receiving a first print job request associated with a user that has been processed, wherein the first print job comprises a first set of one or more printing parameters;

identifying a final page of the first print job request;

determining, via a processor, a user threshold measurement of an amount of space on the final page of the first print job request that was used for printing purposes;

receiving a second print job request associated with the user, wherein the second print job request comprises a second set of one or more printing parameters;

identifying a final page of the second print job request;

determining a measurement associated with an amount of space on the final page of the second print job request that is used for printing purposes;

determining that the second print job request is to be performed in a two-sided printing mode;

determining that the second print job request would yield an odd number of printed document sides; and in response to the user threshold measurement exceeding the measurement and in response to determining that the second print job request would yield an odd number of printed document sides, shrinking at least a portion of the second print job request using a shrink-to-fit process to yield a modified print job request.

10. The method of claim 9, further comprising printing, via a printing device, the second print job request to yield a printed document.

11. The method of claim 9, wherein the modifying using a shrink-to-fit process comprises using a shrink-to-fit process to reduce a page count of the second print job request.

12. The method of claim 9, further comprising automatically reducing font size of at least some content of the second print job request.

13. The method of claim 9, further comprising:

presenting, via a display device, a preview of the second print job request; and receiving, via an input device, a user request to modify the second print job request.

14. The method of claim 13, further comprising, in response to receiving the user request, using the shrink-to-fit process to further reduce page count in second print job request.

15. The method of claim 13, further comprising, in response to receiving the user request, reducing font size for content in the second print job request.

* * * * *